United States Patent
Chemelli et al.

(10) Patent No.: US 11,353,098 B2
(45) Date of Patent: Jun. 7, 2022

(54) VEHICLE DRIVELINE COMPONENT HAVING A DIRECTION-REVERSING MECHANISM FOR MOVING A MOVABLE ELEMENT TO CHANGE AN OPERATIONAL MODE OF THE VEHICLE DRIVELINE COMPONENT

(71) Applicant: American Axle & Manufacturing, Inc., Detroit, MI (US)

(72) Inventors: Douglas J. Chemelli, Royal Oak, MI (US); Joseph S. Balenda, II, Grand Blanc, MI (US); Peter Barta, Farmington, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/228,789

(22) Filed: Apr. 13, 2021

(65) Prior Publication Data
US 2021/0348677 A1 Nov. 11, 2021

Related U.S. Application Data

(60) Provisional application No. 63/021,122, filed on May 7, 2020.

(51) Int. Cl.
| | |
|---|---|
| *F16H 48/08* | (2006.01) |
| *F16H 48/24* | (2006.01) |
| *F16H 48/34* | (2012.01) |
| *F16D 11/14* | (2006.01) |
| *F16D 27/09* | (2006.01) |

(52) U.S. Cl.
CPC ............ *F16H 48/08* (2013.01); *F16H 48/24* (2013.01); *F16D 11/14* (2013.01); *F16D 27/09* (2013.01); *F16H 2048/346* (2013.01)

(58) Field of Classification Search
CPC ......... F16D 41/12–18; F16D 2011/002; F16D 11/14; F16D 27/09; F16D 27/118
See application file for complete search history.

(56) References Cited

U.S. PATENT DOCUMENTS

| | | | | |
|---|---|---|---|---|
| 1,682,386 A | * | 8/1928 | Lewis ................... | F16H 48/24 475/223 |
| 1,719,095 A | * | 7/1929 | West ..................... | F16H 48/24 475/237 |

(Continued)

*Primary Examiner* — Ernesto A Suarez
*Assistant Examiner* — James J Taylor, II
(74) *Attorney, Agent, or Firm* — Burris Law, PLLC (57) ABSTRACT

A vehicle driveline component includes a case defining lever apertures, a coupling having a movable member that is movable along a movement axis between a first and a second position, a linear having a motor output member movable along the movement axis, and a plurality of levers. Each lever is disposed in an associated lever aperture and coupled to the case for pivoting motion about a respective lever pivot axis. The levers urge the movable member in a first direction along the movement axis from one of the first and second positions to the other one of the first and second positions in response to pivoting motion of the levers about the lever pivot axes caused by contact between the levers and the motor output member when the motor output member is driven in a second direction along the movement axis that is opposite the first direction.

6 Claims, 5 Drawing Sheets

(56) References Cited

U.S. PATENT DOCUMENTS

| | | | |
|---|---|---|---|
| 2,459,870 A * | 1/1949 | Cook | F16H 48/22 |
| | | | 475/150 |
| 3,063,529 A | 9/1959 | Cook | |
| 4,271,722 A * | 6/1981 | Campbell | F16H 48/30 |
| | | | 475/86 |
| 5,030,181 A | 7/1991 | Keller | |
| 5,098,360 A | 3/1992 | Hirota | |
| 5,911,643 A | 6/1999 | Godlew et al. | |
| 7,001,303 B1 | 2/2006 | Peura | |
| 8,096,913 B2 * | 1/2012 | Allmendinger | B60K 17/354 |
| | | | 475/231 |
| 8,454,471 B2 * | 6/2013 | Isken, II | F16H 48/24 |
| | | | 475/231 |
| 9,212,704 B2 * | 12/2015 | Andonian | F16D 27/118 |
| 10,724,622 B2 * | 7/2020 | Vuksa | F16H 57/037 |
| 2018/0031052 A1 | 2/2018 | Diemer | |

* cited by examiner

VEHICLE DRIVELINE COMPONENT HAVING A DIRECTION-REVERSING MECHANISM FOR MOVING A MOVABLE ELEMENT TO CHANGE AN OPERATIONAL MODE OF THE VEHICLE DRIVELINE COMPONENT

CROSS-REFERENCE TO RELATED APPLICATIONS

This application claims the benefit of U.S. Provisional Patent Application No. 63/021,122 filed May 7, 2020, the disclosure of which is incorporated by reference as if fully set forth in detail herein.

FIELD

The present disclosure generally relates to a vehicle driveline component with a vehicle driveline component having a direction-reversing mechanism for moving a movable element to change an operational mode of the vehicle driveline component.

BACKGROUND

The statements in this section merely provide background information related to the present disclosure and may not constitute prior art.

Vehicle driveline components, such as axle assemblies, center differential assemblies, power take-off units and transfer cases, are commonly operable in one or modes based on the position of a movable element of a coupling. Various electrically, hydraulically, pneumatically, mechanically or electro-mechanically operated actuators have been employed to control the movement of the moveable element of such couplings. Typically, such actuators have an actuator output member that directly or indirectly moves the movable element of the coupling with the actuator output member. In this regard, the movable element is moved in a direction in which the actuator output member moves and is moved by a distance that is equal to the distance by which the actuator output member is moved.

We have found that it may be desirable in certain situations to move the movable element of a coupling in a direction opposite the direction in which an actuator output member is moved. Additionally or alternatively, we have found that it may be desirable in certain situations to move the movable element of the coupling by an amount that is different from that by which the actuator output member is moved, for example to provide for an extended amount of travel for the movable element to compensate for wear or to provide a mechanical advantage.

SUMMARY

This section provides a general summary of the disclosure and is not a comprehensive disclosure of its full scope or all of its features.

In one form, the present disclosure provides a vehicle driveline component that includes a case, a coupling, a linear motor, and a plurality of levers. The case has a wall member and defines an internal cavity and a plurality of lever apertures. The lever apertures are formed through the wall member and intersect the internal cavity. The coupling is disposed in the internal cavity in the case and includes a movable member that is movable within the case along a movement axis between a first position and a second position. The coupling is configured to transmit rotary power therethrough when the movable member is in the first position and transmission of rotary power through the coupling is inhibited when the movable member is in the second position. The linear motor has a motor output member that is movable along the movement axis. Each of the levers are disposed in an associated one of the of the lever apertures and coupled to the case for pivoting motion about a respective lever pivot axis. The levers urge the movable member of the coupling in a first direction along the movement axis from one of the first and second positions to the other one of the first and second positions in response to pivoting motion of the levers about the lever pivot axes that is caused by contact between the levers and the motor output member when the motor output member is driven in a second direction along the movement axis that is opposite the first direction. According to a variety of alternate forms: the linear motor includes an electromagnet coil, the electromagnet coil in this form may be the motor output member; the vehicle driveline component further comprises a spring that biases the movable member toward one of the first and second positions, wherein the spring is disposed along the movement axis between the movable member and the wall member of the case; the vehicle driveline component further comprises a differential gearset having a differential output member, wherein the coupling comprises a first dog and a second dog, wherein the first dog is coupled to the differential output member for rotation therewith about the movement axis, wherein the second dog is non-rotatably but axially slidably coupled to the case, and wherein the movable member of the coupling is the second dog; the vehicle driveline component further comprises a housing, wherein the case is disposed in the housing; the motor output member is slidably mounted on the case.

In another form, the present disclosure provides a vehicle driveline component that includes a structure, a coupling, a linear motor, and a plurality of levers. The coupling has a movable element that is configured to move relative to the structure along a translation axis in a first direction from a first position to a second position, and in a second direction opposite the first direction from the second position to the first position, wherein placement of the movable element in the first position rotatably couples a rotary input of the coupling to a rotary output of the coupling, and wherein placement of the movable element in the second position rotatably couples the rotary input of the coupling from the rotary output of the coupling. The linear motor has a motor output member that is movable along the translation axis in the first direction from a third position to a fourth position, and in the second direction from the fourth position to the third position. The levers are pivotally coupled to the structure and engageable to the motor output member and the moveable element. Movement of the motor output member in the second direction along the translation axis into the third position causes the levers to pivot relative to the structure and urge the movable element in the first direction toward the second position. According to a variety of alternate forms: the linear motor comprises an electromagnetic coil, the electromagnetic coil has an annular shape and is mounted about the structure; the coupling comprises a dog clutch having a first dog member and a second dog member, wherein the first dog member is the rotary input of the coupling, wherein the second dog member is the rotary output of the coupling, and wherein one of the first and second dog members is the movable element; the vehicle driveline component further comprises a differential gearset disposed in the structure, the differential gearset has a first differential output and a second differential output, wherein the rotary output of the coupling is axially slidably but non-rotatably coupled to the structure, and wherein the first differential output is fixedly coupled to the rotary input of the coupling; the differential gearset comprises a plurality of differential pinions that are coupled to the structure for rotation about the translation axis, each of the differential pinions being rotatable relative to the structure about an associated pinion axis, and wherein each of the first and second differential outputs is a side gear that is meshingly engaged with the differential pinions; the movable element is non-rotatably but axially slidably coupled to one of the rotary input and the rotary output in each of the first and second positions, and is non-rotatably but axially slidably coupled to the other one of the rotary input and the rotary output in the first position; the motor output member is slidably mounted on the structure; the vehicle driveline component further comprises a housing, wherein the structure is disposed in the housing for rotation about the translation axis; the structure defines a plurality of lever apertures, wherein each of the levers is disposed in a corresponding one of the lever apertures.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Figure 1:
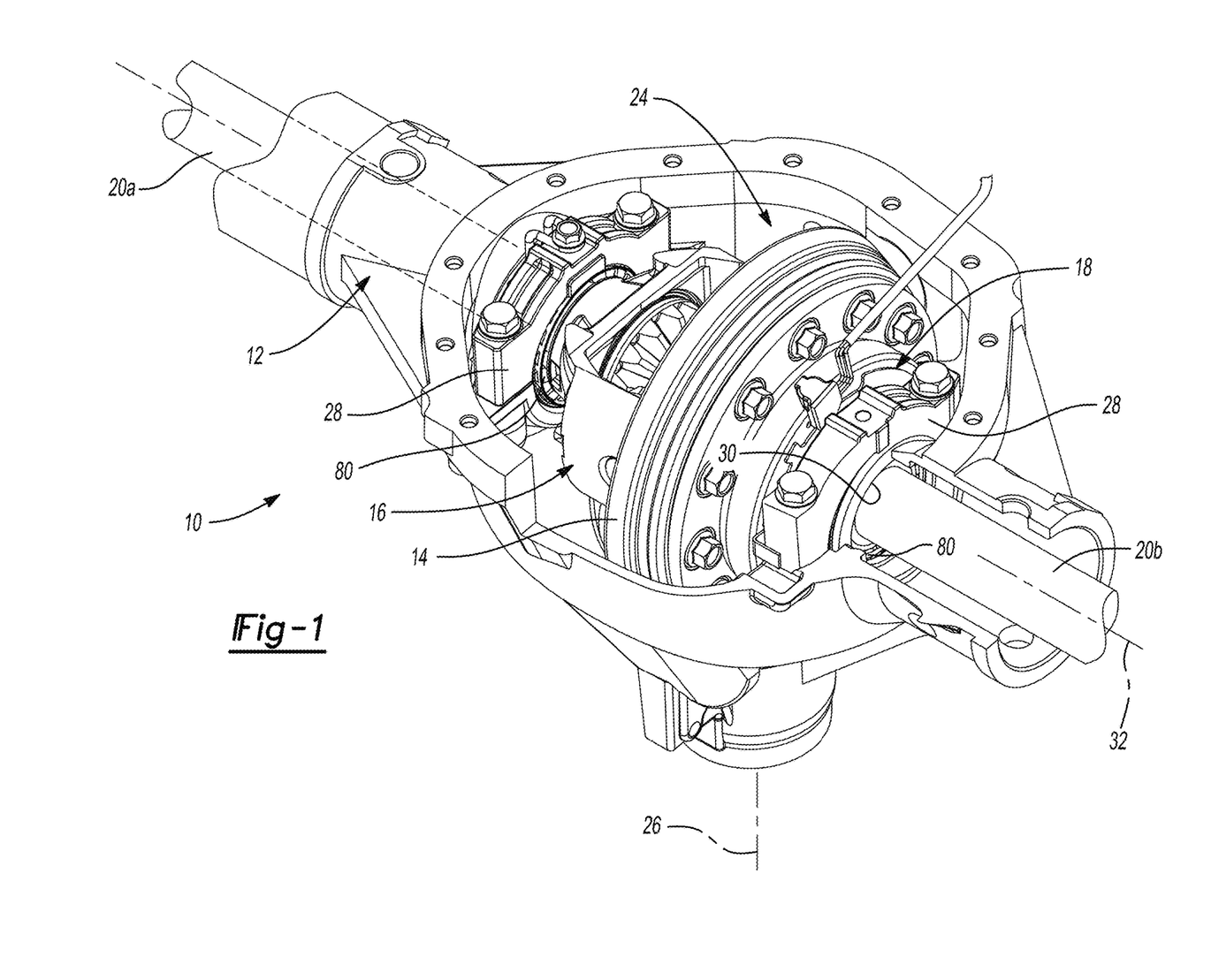
FIG. 1 is a partially broken away perspective view of a portion of a first vehicle driveline component constructed in accordance with the teachings of the present disclosure.

With reference to FIG. 1, an exemplary vehicle driveline component constructed in accordance with the teachings of the present disclosure is generally indicated by reference numeral 10. The vehicle driveline component 10 is illustrated as a rear axle assembly in the particular example provided and includes a disconnect mechanism that permits the rear axle assembly to operate in an active mode, in which rotary power can be transmitted through the rear axle assembly to drive a pair of vehicle wheels (not shown), and an inactive mode, in which rotary power is not transmitted through the rear axle assembly to drive the pair of vehicle wheels. It will be appreciated that the teachings of the present disclosure have application to various other vehicle driveline components, such as power take-off units, transfer cases, center differentials, and front axle assemblies and can be integrated into devices that can broadly be described as couplings having an axially movable member that permits the coupling (or the device to which the coupling is incorporated) to operate in two distinct modes of operation. Such couplings can be employed to selectively decouple parts of the coupling from one another, for example to interrupt the transmission of rotary power through the coupling, and/or to selectively lock various components to one another as might be employed to change speed ratios in a multi-speed transmission or to rotationally lock one component to another.

In the example provided, the vehicle driveline component 10 includes a housing 12, an input pinion (not shown), a ring gear 14, a differential assembly 16, a disconnect mechanism 18 and a pair of output shafts 20a, 20b. The housing 12 can be configured in a conventional and well-known manner and can define a central cavity 24 and an input pinion bore (not shown) that can intersect the central cavity 24. The input pinion bore is disposed along a first axis 26. The housing 12 can include a pair of bearing journals 28 that extend into the central cavity 24 and which have bearing bores 30 formed therethrough. The bearing bores 30 are disposed along a second axis 32 that is transverse to the first axis 26. The input pinion is received through the input pinion bore and is rotatable relative to the housing 12 about the first axis 26. The input pinion includes a pinion gear (not shown) that is disposed in the central cavity 24. The ring gear 14 is received in the central cavity 24 and is rotatable about the second axis 32. The ring gear 14 is meshed with the pinion gear of the input pinion.

Figure 2:
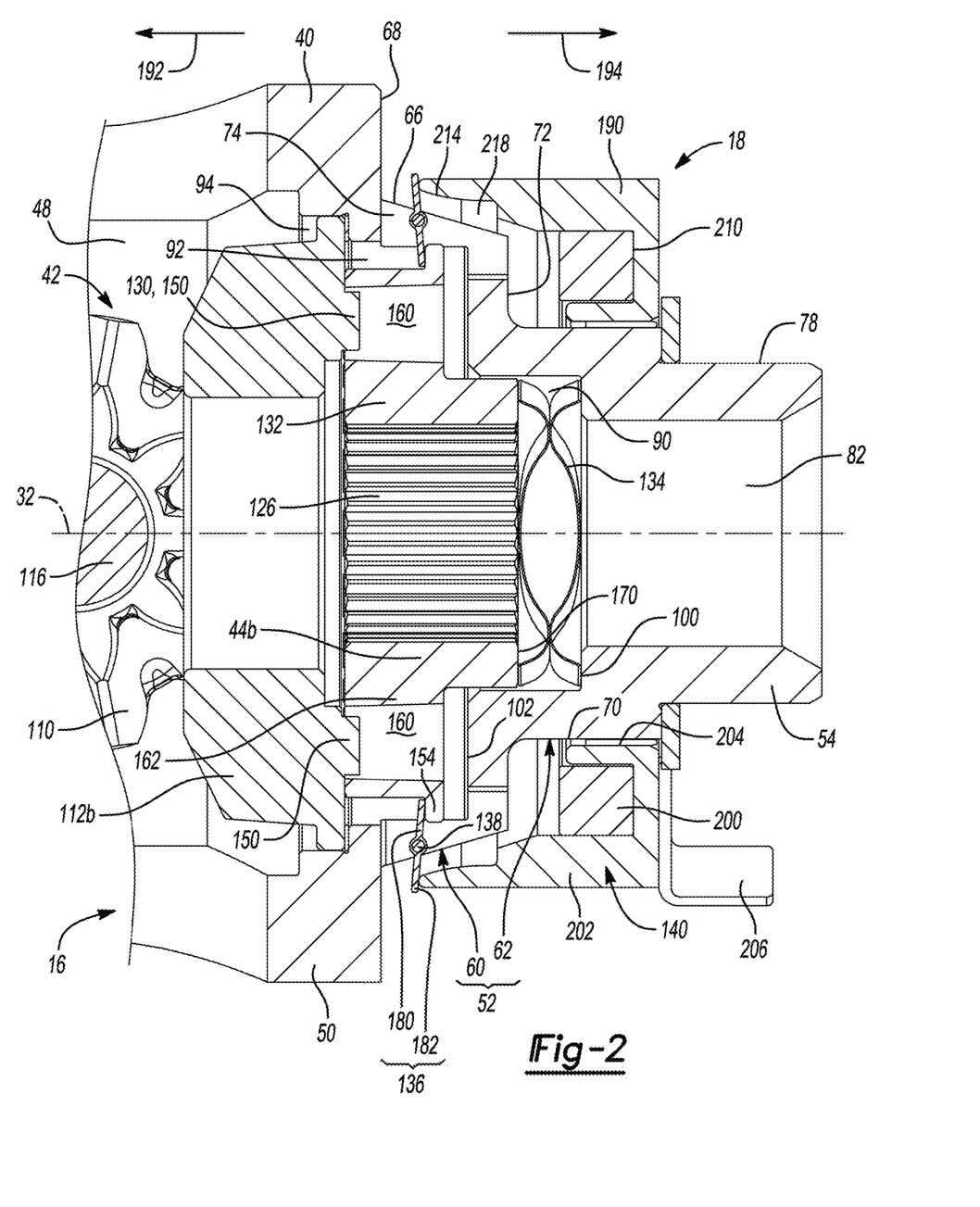
FIG. 2 is a cross-sectional view of a portion of the vehicle driveline component of FIG. 1, illustrating a portion of a differential assembly and a disconnect mechanism, the view depicting the disconnect mechanism in a condition that rotatably couples a side gear to a differential output member.
Figure 3:
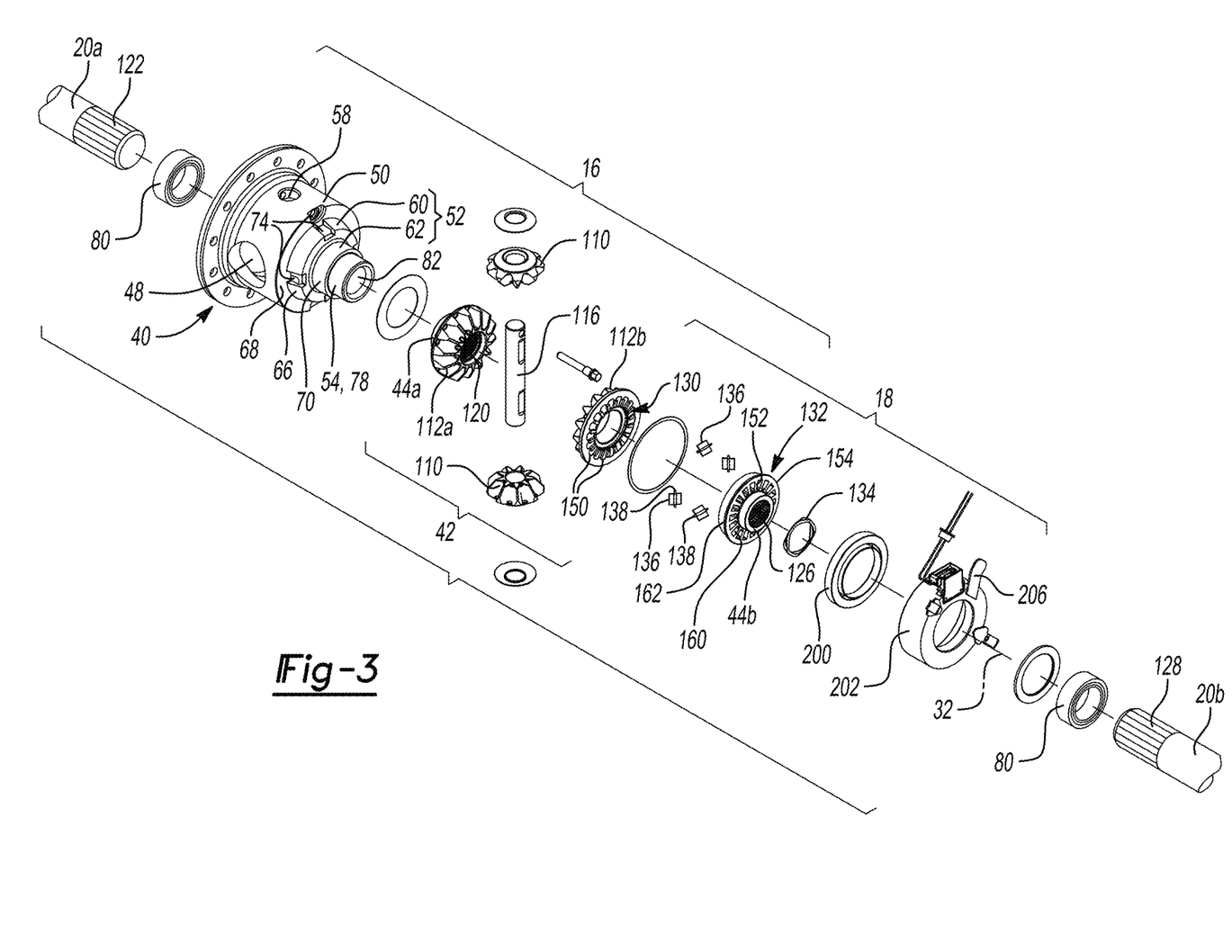
FIG. 3 is an exploded perspective view of a portion of the vehicle driveline component of FIG. 1 illustrating the differential assembly and the disconnect mechanism in more detail.

With reference to FIGS. 2 and 3, the differential assembly 16 can include a differential input member 40, a differential gearset 42 and a pair of differential output members 44a, 44b. In the example provided, the differential input member 40 is a differential case that defines a differential cavity 48 and which comprises a main body 50, an actuator mount 52 and a pair of trunnions 54 (only one shown). In the particular example provided, the differential input member 40 is formed of a magnetically susceptible material, such as cast iron. The main body 50 can have a generally cylindrical exterior surface that is disposed concentrically about the second axis 32. A cross-pin aperture 58 can be formed through the main body 50 in an orientation that is perpendicular to the second axis 32. The actuator mount 52 can include an armature portion 60 and a motor mount portion 62. The armature portion 60 can be disposed along the second axis 32 between the main body 50 and the motor mount portion 62 and can have an armature surface 66 that can be frusto-conically shaped in a manner that diverges outwardly from the second axis 32 with increasing distance from the motor mount portion 62. The axial end of the armature surface 66 adjacent to the main body 50 can be relatively smaller in diameter than the main body 50 and as such, a first external shoulder 68 is formed where the armature portion 60 and the main body 50 intersect one another. The motor mount portion 62 has a cylindrically shaped mounting surface 70 that is disposed concentrically about the second axis 32. The motor mount portion 62 can be relatively smaller in diameter than the armature portion 60 and as such, a second external shoulder 72 can be formed where the motor mount portion 62 intersects the armature portion 60. A plurality of lever apertures 74 can be formed through the actuator mount 52 and can intersect the differential cavity 48. The lever apertures 74 can be spaced circumferentially about the second axis 32. In the example provided, the lever apertures 74 are formed in the armature portion 60 and extend through the armature surface 66.

The trunnions 54 have a bearing mount surface 78 that is disposed concentrically about the second axis 32 and which are sized to receive a pair of differential bearings 80 thereon that rotationally support the differential input member 40 for rotation about the second axis 32 relative to the housing 12 (FIG. 1). One of the trunnions 54 projects axially from an axial end of the actuator mount 52 that is opposite the main body 50, while the other one of the trunnions 54 projects axially from an axial end of the main body 50 that is opposite the actuator mount 52. A through bore 82 is formed through the trunnions 54 that intersects the differential cavity 48.

With specific reference to FIG. 2, the differential cavity 48 can include a first counterbore 90, a second counterbore 92 and a third counterbore 94. The first, second and third counterbores 90, 92 and 94 are formed concentric with the through bore 82 and define first, second and third internal shoulders 100, 102 and 104, respectively, that are disposed concentrically about the second axis 32 and which are spaced apart from one another along the second axis 32. The second internal shoulder 102 is disposed along the second axis 32 between the first internal shoulder 100 and the third internal shoulder 104. The lever apertures 74 intersect the second counterbore and are disposed axially along the second axis 32 between the first and second internal shoulders 100 and 102.

Returning to FIGS. 2 and 3, the differential gearset 42 is configured to transmit rotary power between the differential input member 40 and the differential output members 44a, 44b and to permit speed differentiation between the differential output members 44a, 44b. In the example provided, the differential gearset 42 is configured with a plurality of bevel gears, but it will be appreciated that the differential gearset could be constructed differently, for example with helical gears or as a planetary gearset with one or more sun gears, one or more sets of planetary gears, one or more planet carriers, and one or more internal gears. In the example provided, the differential gearset 42 includes a pair of differential pinions 110 and a pair of side gears 112a, 112b. The differential pinions 110 are coupled to the differential input member 40 for rotation therewith but are each rotatable about a respective differential pinion axis relative to the differential input member 40. The differential pinions 110 can optionally be rotatably mounted on a cross-pin 116 that is received through the cross-pin aperture 58 in the differential input member 40 and which is fixedly coupled to the differential input member 40. Each of the side gears 112a, 112b can be meshingly engaged to the differential pinions 110. The differential output member 44a is a hub that is fixedly coupled to the side gear 112a. In the particular example shown, the side gear 112a and the differential output member 44a are unitarily and integrally formed. The differential output member 44a has an internally toothed or splined aperture 120 that is configured to be meshingly engaged with an externally toothed or splined segment 122 on the output shaft 20a to thereby rotationally couple the differential output member 44a and the output shaft 20a. Like the differential output member 44a, the differential output member 44b is a hub that has an internally splined or toothed aperture 126 that is configured to be meshingly engaged with an externally toothed or splined segment 128 on the output shaft 20b to thereby rotationally couple the differential output member 44b and the output shaft 20b. However, the differential output member 44b and the side gear 112b are formed as discrete components that are not fixedly coupled to one another.

The disconnect mechanism 18 can include a first dog 130, a second dog 132, a biasing spring 134, a plurality of levers 136, a plurality of pins 138 and a linear motor 140. The first dog 130 can include a plurality of first dog members 150 that can be fixedly coupled to the side gear 112b, while the second dog 132 can be fixedly coupled to the differential output member 44b and can include a plurality of second dog members 152 and a circumferentially-extending projection 154. The first and second dog members 150 and 152 form a coupling (i.e., a dog clutch in the example provided) and can be configured in any desired manner. In the example shown, the first dog members 150 are face teeth that are unitarily and integrally formed with the side gear 112b and which extend from a side of the side gear 112b that is opposite the gear teeth of the side gear 112b, while the second dog members 152 are radially extending walls or webs that are disposed between circumferentially spaced apart tooth apertures 160 formed in a flange 162 that extends radially from the differential output member 44b. Each of the tooth apertures 160 is sized to receive a corresponding one of the first dog members 150 therein. The differential output member 44b is received in the first counterbore 90 and is slidable along the second axis 32. The second dog 132 is received in the second counterbore 92 and is slidable along the second axis 32. The side gear 112b is received in the third counterbore 94 and the third internal shoulder 104 limits movement of the side gear 112b and first dog 130 in a direction along the second axis 32 toward the second internal shoulder 102. The second dog 132 is relatively thinner than the depth of the second counterbore 92 to permit the second dog 132 to be moved along the second axis 32 between a first position (shown in FIG. 2), in which the first and second dog members 150 and 152 are engaged to one another to permit torque transmission between the side gear 112b and the differential output member 44b, and a second position (shown in FIG. 4) in which the first and second dog members 150 and 152 are disengaged from one another to inhibit torque transmission between the side gear 112b and the differential output member 44b.

The biasing spring 134 can be disposed along the second axis 32 in a location that applies a biasing force to second dog 132 (and the differential output member 44b) that tends to drive the second dog 132 into one of the first and second positions. The biasing spring 134 can be any type of spring, such as a helical coil compression spring. In the example provided, the biasing spring 134 is a wave spring that is disposed between the first internal shoulder 100 on the differential input member 40 and an axial end 170 of the differential output member 44b that is opposite the side gear 112b and which is configured to bias the second dog 132 into the first position.

Each of the levers 136 is received in a corresponding one of the lever apertures 74 and is pivotally coupled to the differential input member 40. In the example provided, pins 138 are disposed through the levers 136 and are received into pin apertures (not specifically shown) formed in the differential input member 40. Each of the levers 136 includes a first lever segment 180 and a second lever segment 182. The first lever segments 180 extend into the second counterbore 92 and are configured to contact the circumferentially-extending projection 154 that extends radially from a radially outward surface of the flange 162 of the second dog 132. The second lever segments 182 extend radially outwardly from the armature surface 66.

The linear motor 140 has a motor output member 190 that is movable along the second axis 32 in a first direction (designated by arrow 192) to selectively contact the second lever segments 182 and cause rotational movement of the levers 136 about the pins 138 such that the first lever segments 180 contact the circumferentially-extending projection 154 and drive the second dog 132 in a second direction (designated by arrow 192) along the second axis 32 that is opposite the first direction to drive the second dog 132 into the second position. The linear motor 140 can be any type of device that is configured to translate an output member, such as a solenoid, a pneumatic or hydraulic cylinder, a device driven by a lead or ball screw, for example. Movement of the output member need not be constrained to a straight line, and moreover could include some modicum of rotation. In the example provided, the linear motor 140 includes an electromagnet coil 200, a pole piece 202, a bushing 204 and a bracket 206.

With specific reference to FIG. 2, the electromagnet coil 200 is potted into a coil groove 210 that is formed in the pole piece 202. The pole piece 202, which is the motor output member 190 in the example provided, is an annular structure that is formed of a magnetically susceptible material and which defines a pole piece surface 214. The pole piece surface 214 is disposed concentrically about the second axis 32 and is frustoconically-shaped in a manner that is configured to mate to the armature surface 66. If desired, a counterbore 218 or another form of discontinuity can be formed into the pole piece 202 to effectively lower the surface area over which the pole piece surface 214 is able to contact the armature surface 66. The bushing 204 is received into the pole piece 202 and is mounted to the bearing mount surface 78 of the motor mount portion 62 for sliding movement along the second axis 32. The bracket 206 can be fixedly coupled to the pole piece 202 and can engage the housing 12 to limit or inhibit rotation of the linear motor 140 about the second axis 32 relative to the housing 12. In the example provided, the bracket 206 spans across and contacts the bearing journals 28.

Figure 4:
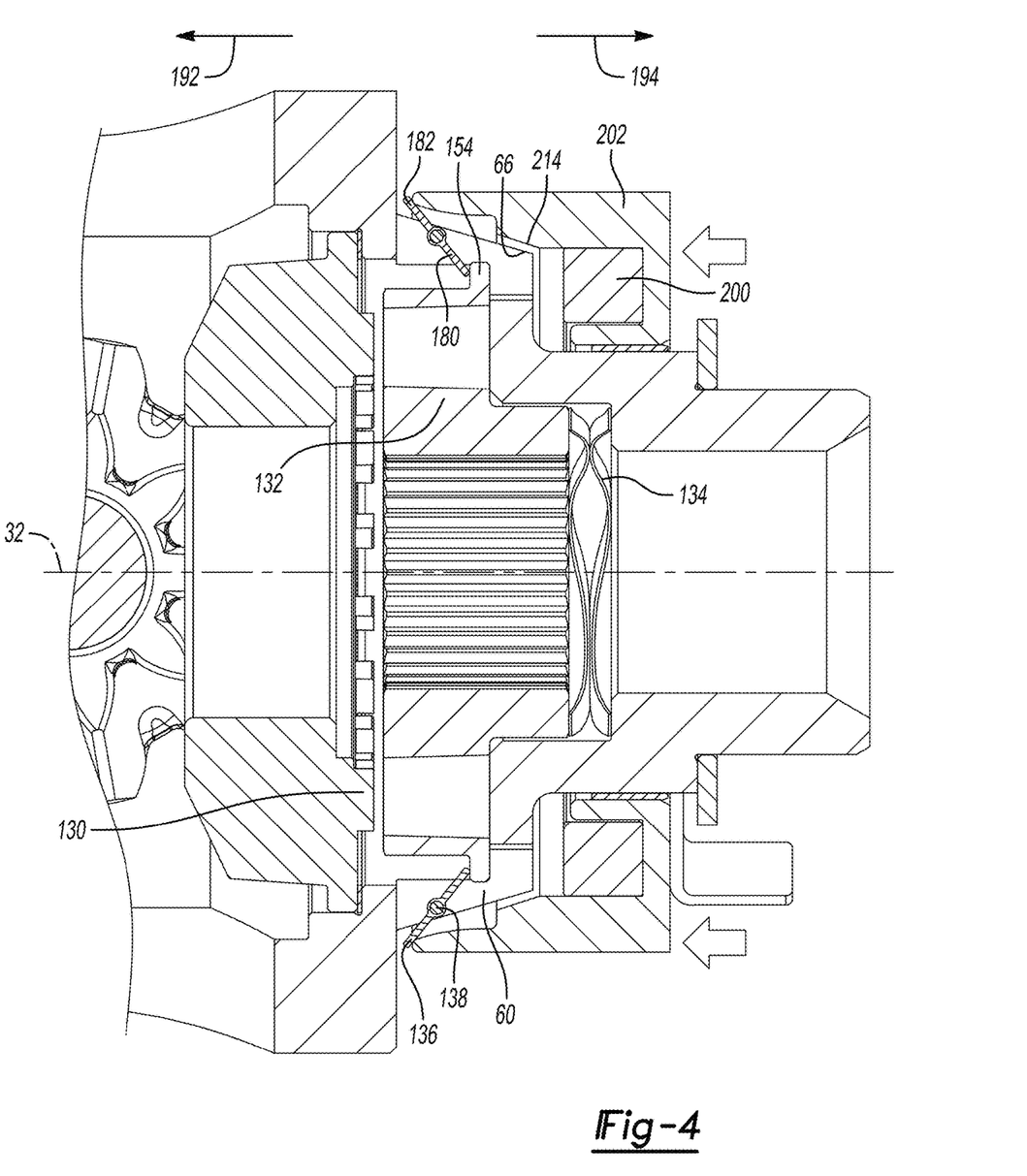
FIG. 4 is a view similar to that of FIG. 2 but depicting the disconnect mechanism in a condition where the side gear and the differential output member are rotatably decoupled.

With reference to FIG. 4, when the electromagnet coil 200 is in an energized state, the electromagnetic coil 200 generates a magnetic field, and magnetic flux is transmitted in a transmission path that extends between the pole piece surface 214 and the armature surface 66 to draw the pole piece 202 in the first direction (arrow 192) along the second axis 32 toward the armature portion 60. The pole piece 202 is attracted to the armature portion 60 with sufficient force so that the pole piece 202 contacts the second lever segments 182 of the levers 136 as the pole piece 202 is moved in the first direction (arrow 192) with sufficient force to overcome the biasing force of the biasing spring 134 and cause the levers 136 to pivot about the pins 138 such that the first lever segments 180 contact the circumferentially-extending projection 154 on the second dog 132 to drive the second dog 132 in the second direction (arrow 194) along the second axis 32 and move the second dog 132 into the second position where the second dog 132 is decoupled from the first dog 130.

Returning to FIG. 3, when the electromagnetic coil 200 is de-energized, the magnetic field produced by the electromagnetic coil 200 will dissipate so that the pole piece 202 is not magnetically attracted to the armature portion 60. In the absence of the magnetically generated force between the pole piece 202 and the armature portion 60, the force of the biasing spring 134 is sufficient to drive the differential output member 44b and the second dog 132 along the second axis 32 to move the second dog 132 into the first position where the second dog 132 is engaged to the first dog 130.

Figure 5:
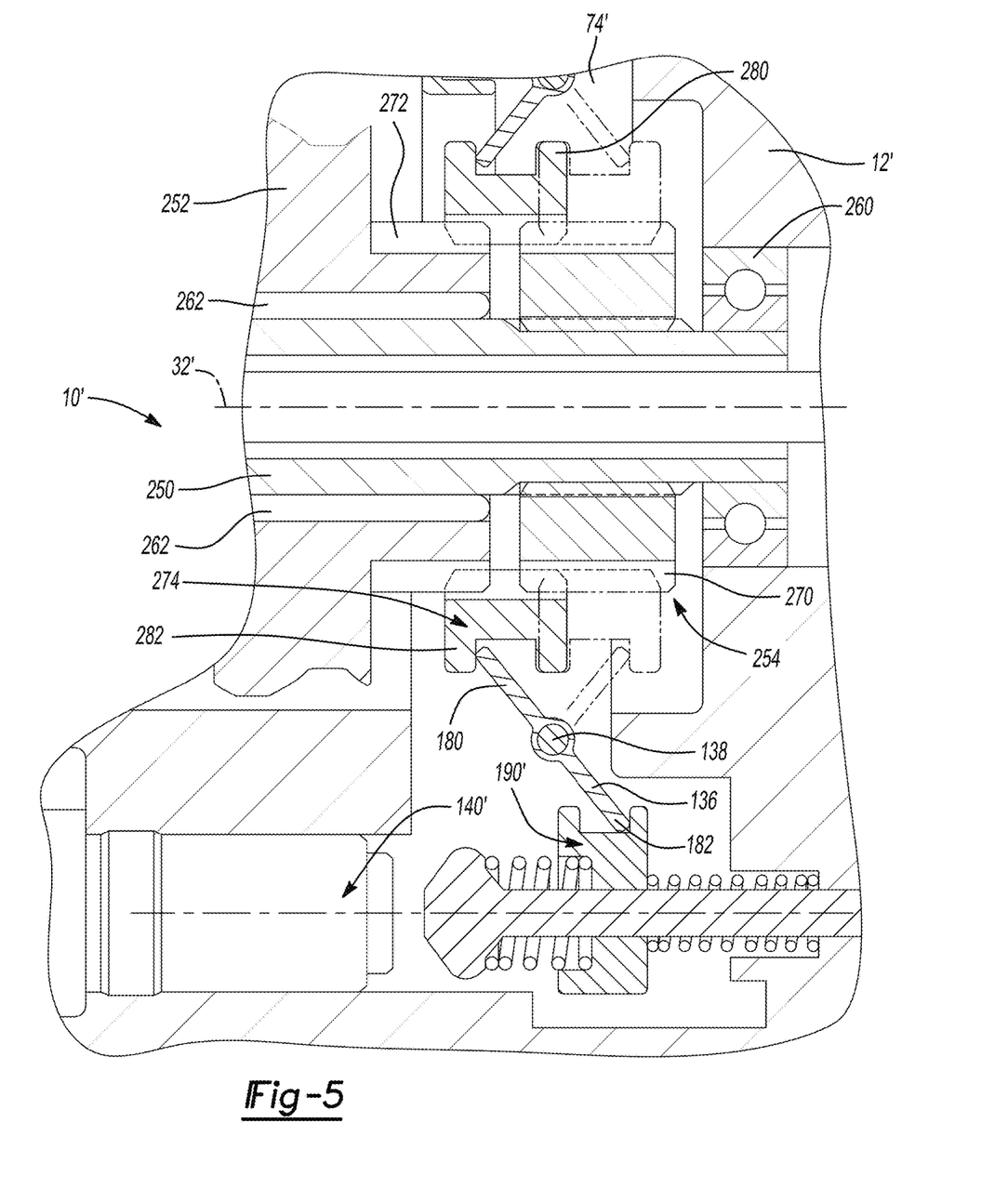
FIG. 5 is a section view of a portion of a second vehicle driveline component constructed in accordance with the teachings of the present disclosure.

While a coupling constructed in accordance with the teachings of the present disclosure has been illustrated and described as being employed to selectively couple a side gear of a differential gearset to a differential output member, it will be appreciated that the present teachings have broader application. For example, a second vehicle driveline component constructed in accordance with the teachings of the present disclosure is illustrated in FIG. 5 and is generally indicated by reference numeral 10'. The vehicle driveline component 10' is depicted as being a power take-off unit having a housing 12', an input shaft 250, an intermediate gear 252, a coupling 254, a plurality of levers 136, a plurality of pins 138 and a linear motor 140'. A first bearing 260 is received between the housing 12' and the input shaft 250 to support the input shaft 250 relative to the housing 12' for rotation about an axis 32'. A second bearing 262 is disposed between the input shaft 250 and the intermediate gear 252 such that the intermediate gear 252 is rotatable about the axis 32' relative to the input shaft 250. The coupling 254 comprises a first set of external teeth 270, which are coupled to the input shaft 250 for common rotation, a second set of external teeth 272, which are formed on the intermediate gear 252, and an internally toothed collar 274. The internal teeth of the collar 274 are matingly engaged to the first set of external teeth 270 so that the collar 274 is non-rotatably but axially slidably coupled to the input shaft 250. The collar 274 is movable between a first position, in which the internal teeth of the collar 274 are engaged solely to the first set of external teeth 270, and a second position in which the internal teeth of the collar 274 are engaged to both the first and second sets of external teeth 270 and 272 to thereby couple the intermediate gear 252 to the input shaft 250. The levers 136 are received in lever apertures 74' formed in the housing 12'. The pins 138 are received through the levers 136 and pivotally couple the levers 136 to the housing 12'. One or more biasing springs (not specifically shown) can be employed to bias the collar 274 into a desired position. In the example provided, torsion springs (not shown) are employed to urge the levers 136 into contact with a first circumferential rib 280 formed on the collar 274 and drive the collar 274 along the axis 32' into the first position. The linear motor 140', which is depicted as being a solenoid in the example provided, can be operated to drive the motor output member 190', which is a sleeve-like structure, into contact with the second lever segments 182 of the levers 136 with sufficient force to overcome the torsion springs and pivot the levers 136 about the pins 138 to drive the first lever segments 180 into contact with a second circumferential rib 282 formed on the collar and drive the collar 274 along the axis 32' into the second position.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle driveline component comprising:
 a case having a wall member and defining an internal cavity and a plurality of lever apertures, the lever apertures being formed through the wall member and intersecting the internal cavity;
 a coupling disposed in the internal cavity in the case, the coupling having a movable member that is movable within the case along a movement axis between a first position and a second position, wherein the coupling is configured to transmit rotary power therethrough when the movable member is in the first position, and wherein transmission of rotary power through the coupling is inhibited when the movable member is in the second position;
a linear motor having a motor output member that is movable along the movement axis; and
a plurality of levers, each of the levers being disposed in an associated one of the of the lever apertures and coupled to the case for pivoting motion about a respective lever pivot axis;
wherein the levers urge the movable member of the coupling in a first direction along the movement axis from one of the first and second positions to the other one of the first and second positions in response to pivoting motion of the levers about the lever pivot axes that is caused by contact between the levers and the motor output member when the motor output member is driven in a second direction along the movement axis that is opposite the first direction;
wherein the linear motor includes an electromagnet coil; and
wherein the electromagnet coil is the motor output member.

2. The vehicle driveline component of claim 1, further comprising a spring that biases the movable member toward one of the first and second positions.

3. The vehicle driveline component of claim 2, wherein the spring is disposed along the movement axis between the movable member and the wall member of the case.

4. The vehicle driveline component of claim 1, further comprising a differential gearset and a differential output member, the differential gearset having a side gear, wherein the coupling comprises a first dog and a second dog, wherein the first dog is fixedly coupled to the side gear, wherein the second dog is fixedly coupled to the differential output member, and wherein the movable member of the coupling is the second dog.

5. The vehicle driveline component of claim 1, further comprising a housing, wherein the case is disposed in the housing for rotation about the movement axis.

6. The vehicle driveline component of claim 1, wherein the motor output member is slidably mounted on the case.

* * * * *